(12) United States Patent
Mittnacht et al.

(10) Patent No.: US 10,727,900 B2
(45) Date of Patent: Jul. 28, 2020

(54) COMMUNICATION OVER A COMMUNICATION LINE

(71) Applicants: Tobias Mittnacht, Stuttgart (DE); Klaus-Peter Linzmaier, Winterbach (DE)

(72) Inventors: Tobias Mittnacht, Stuttgart (DE); Klaus-Peter Linzmaier, Winterbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/272,320

(22) Filed: Feb. 11, 2019

(65) Prior Publication Data

US 2019/0253103 A1  Aug. 15, 2019

(30) Foreign Application Priority Data

Feb. 12, 2018 (EP) .................................. 18156282

(51) Int. Cl.
| | | |
|---|---|---|
| *H04B 3/50* | (2006.01) | |
| *H04B 3/32* | (2006.01) | |
| *H04B 17/318* | (2015.01) | |
| *H04B 3/30* | (2006.01) | |
| *H04L 7/00* | (2006.01) | |
| *H04L 7/06* | (2006.01) | |
| *H04B 3/487* | (2015.01) | |
| *H04B 3/54* | (2006.01) | |

(52) U.S. Cl.
CPC ................ *H04B 3/50* (2013.01); *H04B 3/30* (2013.01); *H04B 3/32* (2013.01); *H04B 17/318* (2015.01); *H04L 7/007* (2013.01); *H04L 7/06* (2013.01); *H04B 3/487* (2015.01); *H04B 3/54* (2013.01)

(58) Field of Classification Search
CPC .......... H04B 3/50; H04B 17/318; H04B 3/30; H04B 3/32; H04L 7/007; H04L 7/06
See application file for complete search history.

(56) References Cited

U.S. PATENT DOCUMENTS

| | | | |
|---|---|---|---|
| 7,580,344 B1* | 8/2009 | Ojard | H04B 3/32 370/201 |
| 2014/0086290 A1* | 3/2014 | Samy | H04B 3/542 375/222 |
| 2014/0269868 A1* | 9/2014 | Werner | H04B 3/54 375/224 |

FOREIGN PATENT DOCUMENTS

WO    WO2015026972 A1    2/2015

* cited by examiner

*Primary Examiner* — Jaison Joseph
(74) *Attorney, Agent, or Firm* — Lempia Summerfield Katz LLC

(57) ABSTRACT

A method and system are provided for communication between in each case at least two communication terminal devices that are connected to a respective one of at least two coupled communication lines in which a communication protocol is utilized for communication over the respective one of the communication lines and the communication protocol controls transmitting and receiving of communication signals of the respective ones of the at least two communication terminal devices, for which purpose signal carriers are utilized.

17 Claims, 1 Drawing Sheet

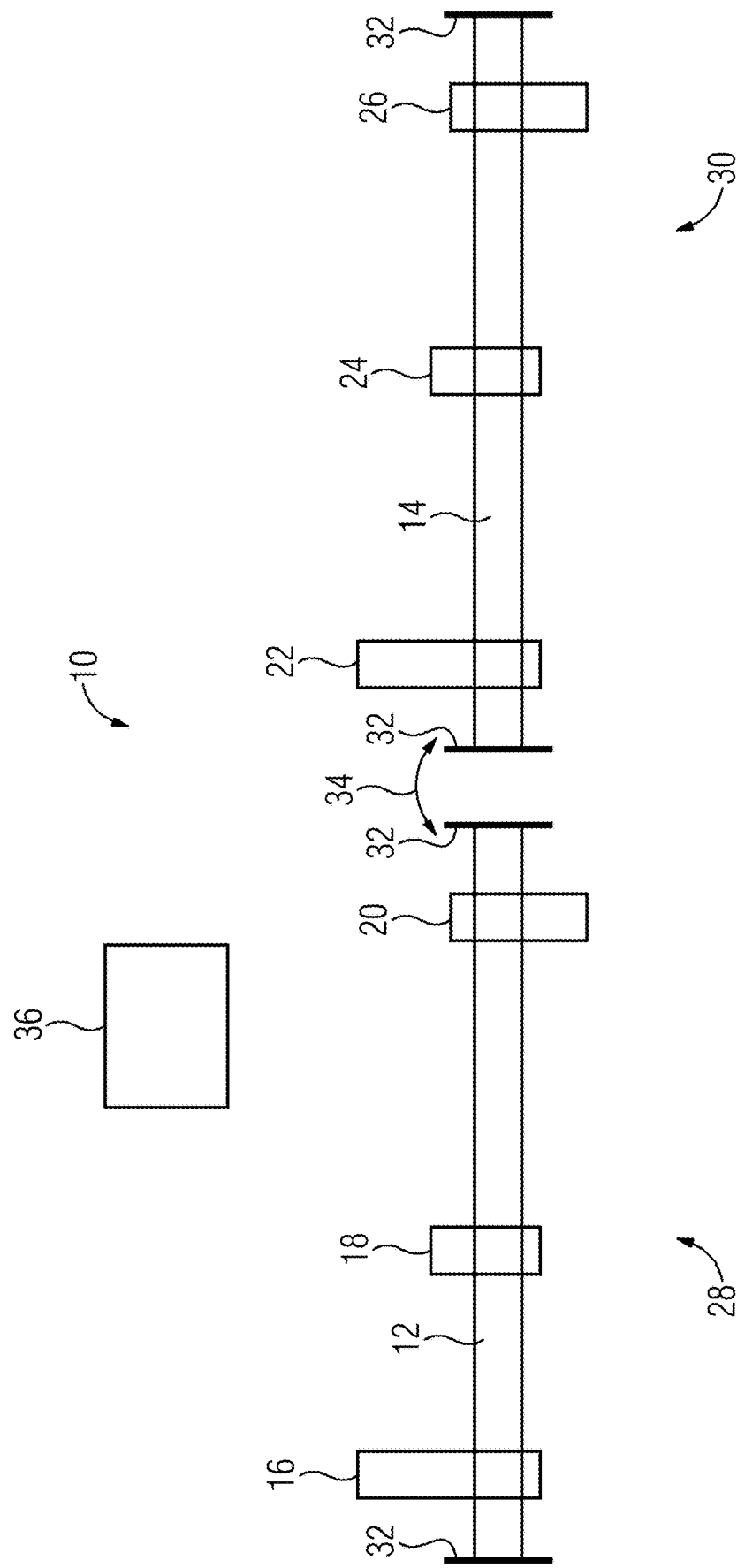

COMMUNICATION OVER A COMMUNICATION LINE

CROSS REFERENCE TO RELATED APPLICATIONS

This application claims the benefit of EP18156282.8 filed on Feb. 12, 2018, which is hereby incorporated by reference in its entirety.

FIELD

Embodiments relate to a method for communication between at least two communication terminal devices.

BACKGROUND

Methods, communication devices and communication terminal devices of a generic type are used in the prior art. The communication devices and communication terminal devices serve to provide one or more communication connections between the at least two communication devices that are connected to the respective communication line.

The communication lines are formed by an electrical cable including corresponding electrical lines that may serve for transferring electrical signals, e.g. the communication signals. The lines may be for example two-wire or stranded lines that are utilized specifically for providing communication connections. However, the lines may also be power supply lines that may, in addition to transferring electrical power, also serve to make a hard-wired communication connection. The communication line may utilize at least two electrical conductors that serve to allow the electrical signals to be transferred.

In order to improve the channel capacity of the hard-wired communication connection that is provided by the communication line, the communication connection may include a multiple-channel form by, for example, utilizing carrier frequency systems. Communication signals are transmitted such that signal carriers, in some cases also called carrier signals or just carriers, are provided by which mutually independently usable channels of the hard-wired communication connection may be provided such that a multiple-channel hard-wired communication connection is made possible.

The signal carriers provide the electrical signals that are directly applied to the communication line or its electrical lines. In this context, a signal carrier may be formed by a periodically varying variable such as an alternating current voltage, an electromagnetic wave, an alternating current and/or similar. The variable may have constant characteristic parameters such as a frequency, amplitude, duty cycle, phase angle and/or similar. Consequently, signal carriers are used so that the communication signals may be transferred over the respective one of the communication lines as useful signals, for example by a carrier frequency method or similar.

To provide the communication signals to be transferred by the signal carriers, the signal carriers may be modulated by a modulation method, predetermined by the communication protocol, in accordance with the communication signals. On the transmission side, the modulation may be performed by a transmitting device that includes a suitable modulator. On the transmission side, the thus modulated signal carriers may be applied to the communication line, for example by the transmitting device of a first one of the at least two communication terminal devices or similar, that emits the communication signals.

The at least one second one of the communication terminal devices, that receives the modulated signal carriers, may receive the signals using a suitable receiving device and demodulate the signals appropriately, by the modulation method predetermined by the communication protocol, using a suitable demodulator of the receiving device, with the result that the communication signals originally for transmission are available again at the second communication terminal device. The communication connection formed in this way need not only be unidirectional but—depending on the communication protocol—may also take a bidirectional form, for example in the manner of a full duplex method or similar. The communication terminal devices are configured for this purpose. The communication terminal devices may each include a transmitting device and a receiving device.

In order to provide a respective channel of the multiple-channel hard-wired communication connection, the communication protocol provides for each of the channels of the multiple-channel hard-wired communication connection to have associated with each of the channels individually at least one of the signal carriers. As a result, communication channels may be created that may be utilized almost independently of one another for the purpose of communication between the at least two communication terminal devices. For example, orthogonal signal carriers may be utilized for this purpose. The orthogonality may also be produced by the modulation method or similar.

Moreover, a communication channel may include more than one of the signal carriers individually associated with it. Furthermore, during normal operation the association of the signal carriers with respective ones of the channels may be varied, in dependence on the communication load. The communication protocol may include appropriate controls making it possible for the communication terminal devices to adjust the association of the signal carriers with the respective channels as appropriate.

The most diverse modulation methods may be used as the modulation method, for example amplitude modulation, frequency modulation or indeed orthogonal frequency-division multiplexing (OFDM), quadrature amplitude modulation (QAM), phase modulation, combinations thereof or similar. Both analog and digital modulation methods, and combinations thereof, may of course be provided.

Generic methods and communication devices and communication terminal devices thus also relate among other things to field bus systems. A field bus is a bus system that couples field devices such as sensing probes, sensors, actuators and/or similar such that the devices communicate within a single system, for example with a control device that may be for example an automation device or similar. At least one communication line may provide a hardware coupling between the field devices and the control device. In order to guarantee communication over the communication line such that there is undisrupted communication between the field devices and the control device. There may also be a communication protocol that controls or establishes which technology is used as the basis and which properties are utilized for communication between the field devices and the control device. A field bus system may for example be an asymmetric digital subscriber line (ADSL), a wireless local area network (WLAN), or a powerline such as HomePlugAV, HomePlugGP or similar. As systems become more and more widespread, the separation of different networks, segments, and for example, communication lines gains in importance.

When hard-wired communication connections, for example multiple-channel hard-wired communication connections, are used line lengths, discontinuities and discontinuities in the routing of the communication lines, including mismatches of the communication lines, may result in reflections. In electrical engineering, this is dealt with in the context of line matching.

Line matching is based on the idea that a characteristic impedance may be associated with an electrical cable, for example, an electrical line. There is matching if, at a line end of a respective one of the communication lines, a connected device provides an impedance substantially corresponding to the characteristic impedance. By contrast, if the impedance differs from the characteristic impedance of the electrical line, reflections may be produced causing standing waves to be formed, for example, at frequencies whereof the wavelength is an integer multiple of a multiple of the line length of the communication line, or of a line section with a mismatched end.

When such frequencies are used as signal carriers, the result may be pronounced crosstalk or feed over between neighboring segments, such as other communication lines, and between signal carriers or channels. With high frequencies a relatively great amount of crosstalk or feed over is to be expected, because multiples of the kind mentioned above occur more densely, and there may be integer multiples for any long line length, for example of several meters or similar. In a range equating to several wavelengths of the line length, it is frequently the case that only inferior quality may be achieved, with the result that the wavelengths may be excited over a broad bandwidth. For general electrical engineering principles relating to electrical lines, the reader is therefore also referred to *Nachrichtentechnik* [Communications Engineering], third edition, Volume II, *Nachrichtenübertragung* [Message Transfer] by W. Ruprecht, Springer Verlag 1982, or similar.

It is already known to reduce or avoid crosstalk or feed over by line ends terminating with appropriate matching. Moreover, with signal carriers utilizing high frequencies, modulation with a relatively low modulation depth—for example with reduced amplitude—may be provided by the communication signal. In this way, for example with a field bus system such as HomePlug, for the purpose of observing standards relating to electromagnetic compatibility, with a frequency of the signal carrier higher than 28 MHz it is typically provided for the power utilized to be reduced by approximately 30 dB. This takes into account the fact that under the above-mentioned applicable standards interfering radiation is only measured from a frequency greater than 30 MHz.

Moreover, it is known to utilize frequency division multiplexing for example in powerline systems to avoid crosstalk or feed over between neighboring segments, or to better achieve the crossover segments or overlapping areas described there. Different frequency bands may be utilized on different lines.

Thus, the communication line needs to have not only two electrical lines but may moreover have further electrical lines, e.g. pairs of electrical lines, of a cable that may be utilized for the provision of the communication connection. In this case, a pair of lines may for example form a segment.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments improve the multiple-channel hard-wired communication connection over a communication line, for example with respect of crosstalk between the at least two communication lines.

On the transmission side, on a first of the at least two communication lines, a transmission power of the signal carriers is set up and/or on the receiving side, on a second of the at least two communication lines, a receiving sensitivity to the signal carriers is set up such that on the receiving side, in relation to the second of the at least two communication lines, a receiving signal strength of the signal carriers of the first of the at least two communication lines is smaller than a predetermined comparison value.

The respective at least two communication terminal devices are configured such that on the transmission side, on a first of the at least two communication lines, a transmission power of the signal carriers is set up and/or on the receiving side, on a second of the at least two communication lines, a receiving sensitivity to the signal carriers is set up such that on the receiving side, in relation to the second of the at least two communication lines, a receiving signal strength of the signal carriers of the first of the at least two communication lines is smaller than a predetermined comparison value.

Embodiments reduce crosstalk or feed over by determining, for example during a startup phase of the method or of the communication device, the frequencies at which relevant crosstalk or feed over occurs. A network analyzer supplies all the frequencies within a utilized frequency band one after the other to a segment or to one of the at least two communication lines and in each case to measures the receiving signal strength at which a receiving signal is received in a neighboring segment or a second of the at least two communication lines. For communication that is performed during actual normal operation, the signal carriers are utilized at the frequencies at which there is sufficient damping of crosstalk.

Signal carriers or the frequencies thereof at which a relevant crosstalk or feed over between two neighboring segments of the communication line occurs may be supplied at a lower transmission power, such that it is no longer possible to determine any relevant crosstalk in neighboring segments or the second of the at least two communication lines.

Further, for powerline-based communication devices, the following definitions apply:

An amplitude map indicates for each signal carrier the power at which the signal carrier is to be transmitted.

A tone map indicates how many bits may be modulated on a respective signal carrier. The tone map relates to a digital signal transmission. If a communication connection using a signal carrier has little damping, and at the frequency there is no disruptive element on the relevant one of the at least two communication lines, it is possible to modulate a large number of bits per symbol on this signal carrier. In the case of HomePlug applications, a method relating to channel estimation is frequently used in the attempt to continuously modulate as many bits as possible on each of the available signal carriers so that a bandwidth may be optimized.

A tone mask indicates which frequencies are not to be taken into account either for transmitting signal carriers or in receiving.

Further, for the purpose of maximizing a data rate, IEE1901 discloses continuing to increase the number of bits per signal carrier until an error rate rises significantly during the communication connection. Once a rise in the error rate is identified, the number of bits per signal carrier is slightly reduced allowing the data rate to be configured dynamically to ambient conditions or to the currently available channel capacity.

Embodiments further provide for each segment or each of the at least two communication lines, for a measuring device that may be used to determine, for example continuously, whether signal carriers from other segments or communication lines may be received making it possible to determine the frequencies at which the signal carriers may be received. For example, the second of the at least two communication lines, may determine the frequencies at which the signal carriers of the first of the at least two communication lines may be received. There is then a possibility either of providing on the transmission side, in the case of the communication terminal devices connected to the first of the at least two communication lines, that the specific determined frequencies are not utilized for signal carriers—for example being eliminated from an amplitude map—and producing a modulation depth having a lower modulation level, for example entering it in the amplitude map at a lower power, and/or also in respect of the second of the at least two communication lines, on the receiving side eliminating it from communication terminal devices connected to this communication line, for example by way of a tone mask and/or similar.

Segment disconnection, e.g. uncoupling the at least two communication lines from one another, need not be performed exclusively using suitable damping values, but rather a logistical segment disconnection may additionally be provided, such as utilizing different network keys in the different segments or in the different communication lines, in which case all the communication terminal devices connected to the same one of the at least two communication lines utilize the same network key. One of the communication terminal devices may be upgraded to serve as a measuring device to determine signal carriers of the other of the at least two communication lines, and the communication terminal device may be provided to be able to include or utilize the network key utilized. If the communication terminal device transmits all the signal carriers at the greatest possible power and receives the signal carriers with the maximum sensitivity, a tone map may be used as the measurement variable for crosstalk or feed over of the individual signal carriers from the neighboring segment measured therewith or the other of the at least two communication lines.

Signal carriers, for example including carrier frequencies that allow a large channel capacity, for example a large bit load, have a tendency to provide crosstalk or feed over to a great extent. Measurements of actual communication devices have shown that this type of measurement is able to produce similar measurement results to when measurement is performed by the network analyzer. The communication terminal devices may be utilized, and the tone map may be utilized as a measure of crosstalk or feed over in respect of the individual signal carriers.

In a case of HomePlug applications, changes to the tone mask and the amplitude map that are made because of measurement results are not possible without a restart of the HomePlug applications or a reboot. The methods are more suitable at the time of startup of the communication device, and are not suitable for subsequent times during operation or operational phases.

Embodiments avoid disadvantages in that the power of the utilized signal carriers or the amplitudes in total—that is of all the signal carriers utilized on the respective one of the communication lines—are changed, for example, to the same extent, such that the signal carriers on the other of the at least two communication lines where possible may barely still be perceived, and not perceived at all. Instead of or in addition to the adaptation, the reduction or indeed increase in the signal level, of the signal carriers, the receiving sensitivity may be reduced or increased to the signal carriers on the other or on the second of the at least two communication lines accordingly. The receiving sensitivity is adjusted accordingly for all the signal carriers, for example in the same way that provides adaptation to be performed in a simple manner. The power of selective signal carriers or indeed corresponding receiving sensitivities need not be adjusted individually.

The receiving signal strength is a measured value of a respective receiving device of the respective communication terminal device. The receiving signal strength may be utilized to determine a variable that makes it possible to adjust the transmission power and/or receiving sensitivity. The receiving signal strength is compared with the predetermined comparison value. Provided the receiving signal strength of the signal carriers of the first of the at least two communication lines is smaller than the predetermined comparison value, in the case of receiving devices of communication terminal devices connected to the remote one of the communication lines, there is in principle no need to make an adjustment. Rather, it is even possible to increase the transmission power and/or to increase the receiving sensitivity. By contrast, if the receiving signal strength of the signal carriers is greater than the predetermined comparison value or indeed is the same as the predetermined comparison value, the transmission power and/or also the receiving sensitivity may be reduced accordingly until the receiving signal strength is once again smaller than the predetermined comparison value. In this way, it is possible to carry out a simple adaptation even during normal operation of the communication device.

The predetermined or predeterminable comparison value may be selected such that communication over the second of the at least two communication lines may proceed substantially undisrupted by the signal carriers on the first of the at least two communication lines. Undisrupted communication may be determined for example by the fact that a bandwidth for the communication is greater than a predetermined minimum bandwidth. Moreover, undisrupted communication may be determined by the fact that a number of usable signal carriers is greater than a predetermined minimum number of signal carriers, and/or a number of bits that may be transmitted per symbol is greater than a predetermined minimum number, e.g. with digital communication. Finally, undisrupted communication may also be determined by the fact that a communication latency is smaller than a predetermined maximum latency. In this case, as an alternative or in addition, a response time in relation to a respective communication partner may also be utilized. Of course, combinations or similar may also be utilized to determine undisrupted communication. The term "undisrupted" may thus also include for example a test signal being transmitted at least by one of two communication terminal devices connected to one of the at least two communication lines and reliably received by the second communication terminal device, despite overlaid disruptions and/or noise.

With a sufficiently small receiving signal strength there is substantially no impairment of the communication connection over the second of the at least two communication lines. Rather, it is possible for almost undisrupted communication using the signal carriers to take place over the second of the at least two communication lines. The comparison value may be for example a factory-set value predetermined at the time of manufacturing the communication device. However, the comparison value may also be a value input during startup of the communication device. Moreover, it is of course also possible to make the comparison value adjustable, such that the comparison value may be predetermined depending on individual local ambient conditions that may affect the communication device.

The communication lines may be at least partly electrically coupled to one another and may achieve a reliable communication connection. For example, if a powerline communication is to be made for where local communication networks are to be provided for different areas of a building. For example, for a multistory building a respective, powerline-based communication network that is limited to one floor may be produced. Because the power supply to the building may be centralized, however, the communication lines—that are at the same time also power supply lines to the individual floors—are also electrically coupled to one another at least at one point. The different communication networks of the different floors may be at least partly electrically coupled.

The receiving sensitivity is an adjustable variable of the receiving devices of the communication terminal devices, such that the communication terminal devices may make reliable communication possible.

The comparison value may be an electrical signal, that may take the form of a suitable signal value, for example an electrical current, electrical voltage or similar. However, comparison value may also be a digital, for example, binary, signal that may be retrievably stored in a memory unit. The transmitting and/or receiving devices may take a corresponding form such that the desired adjustments may be made in dependence on the comparison value.

The coupling may be made in a simple manner and to reduce the coupling far enough for a reliable communication connection to be made floor by floor or a local floor-specific communication network to be made in a manner largely uncoupled from the respective other floor-specific communication networks.

Embodiments are not only suitable for use in building engineering, but may also be used for example on production lines or similar in which delimited communication networks are likewise desired. For example, in field bus systems, in which the number of communication terminal devices that may be connected to a control device is limited. It may be necessary to provide a plurality of mutually independent field bus systems. An undesired coupling of the communication lines for the different field bus systems may occur, with the result that if no measures to suppress interference are taken communication may be impaired that may be remedied in a simple manner. Embodiments may also be suitable for retrofitting already existing systems and thus providing improved communication.

The coupling may also be made for example capacitively and/or inductively, for example if the communication lines are laid parallel to one another or similar. Mechanical constructions, common interference suppressor filters, a jointly utilized electrical reference potential and/or similar may also produce appropriate couplings, for example, if line terminations of the communication lines are only insufficiently matched, with the result that reflections occur, for example, at the line ends. There is then a risk of crosstalk or feed over.

In an embodiment, the transmission power of the signal carriers and/or the receiving sensitivity to the signal carriers are set to be the same. There is no need to set the transmission devices for the signal carriers or indeed the receiving devices individually. Rather, it is sufficient to provide a common setting.

The comparison value may be predetermined such that, over the second of the at least two communication lines, by demodulating the respective ones of the signal carriers—e.g. the signal carriers that are utilized on the second of the at least two communication lines—the communication signals transmitted with the signal carriers over the second of the at least two communication lines are determined to be undisrupted. The communication may be utilized over the second of the communication lines to establish the comparison value that may be used to adjust the power of the signal carriers on the first of the at least two communication lines and/or the receiving sensitivity on the second of the at least two communication lines. Overall, the quality of communication over the second of the at least two communication lines may be utilized to determine or predetermine the comparison value.

The comparison value may be predetermined at the time of startup of communication. The comparison value only needs to be set once. The communication device is permanently installed. However, it the comparison value may be adjustable, that proves advantageous if the communication device is for example a mobile communication device and the construction varies as required which also may include an effect on the coupling between the at least two communication lines, so that a corresponding adjustment of the comparison value may be desired.

The comparison value may be configured at predetermined time points. The comparison value may be configured during normal operation of the communication device as appropriate, for example if changes relating to the coupling of the at least two communication lines and/or similar are made to the communication device. Measures may also relate to a line termination, with the result that the measures has an effect on reflections or similar that may likewise have an effect on communication. The comparison value may be configured dynamically, such that communication that is as optimal as possible may be produced even with varying ambient conditions. The time points may be selected to be equidistant, for example at intervals of one minute, one hour or one or more days. The selection of predetermined time points need not be selected to be equidistant, however, but may also include varying time intervals, depending on the application. Adaptation may be carried out continuously, by determining corresponding measurement results continuously to make it possible to determine the comparison value therefrom.

In an embodiment, that for predetermining the comparison value, receiving signal strengths of the signal carriers of the first of the at least two communication lines may be determined over the second of the at least two communication lines with a predetermined receiving sensitivity, and the comparison value may be predetermined in dependence on the receiving signal strengths of the signal carriers of the first of the at least two communication lines. The predetermined receiving sensitivity may be for example a set receiving sensitivity or indeed a receiving sensitivity that is selected between the set and a maximum receiving sensitivity. The receiving sensitivity may also have a predetermined value, that is set to a specific value, for example, for the purpose of determining the comparison value providing for automatic predetermining of the comparison value. The comparison value may be configured automatically as appropriate allowing for the communication device to be used in a flexible manner with the most diverse applications and at the same time to a large extent provides communication as optimal as possible, in dependence on the respective ambient conditions allowing for setup and/or maintenance work to be reduced, if not even completely dispensed with.

A message signal may be output if the comparison value is predetermined such that a channel capacity for the signal carriers of the second of the at least two communication lines is smaller than a predetermined channel capacity comparison value. The channel capacity comparison value predetermines a minimum channel capacity to be achieved using the communication device, for example, in relation to the second of the at least two communication lines, such that normal, reliable communication over the second of the at least two communication lines may be achieved.

The message signal may apply in reverse to the others of the communication lines. The message signal is thus output if reliable normal communication is not achievable with the method procedure and further measures have to be taken that provide sufficient uncoupling of the at least two communication lines. Uncoupling measures of this kind may be for example the utilization of screening, the elimination of a parallel layout of the communication lines, and/or similar. With digital communication, the channel capacity comparison value indicates for example a minimum data rate or similar. This may be performed for each of the at least two communication lines accordingly. The message signal may moreover already be generated even if the channel capacity is smaller than the predetermined channel capacity comparison value in only one of the at least two communication lines.

The receiving sensitivity may include a damping of receiving of the signal carriers that is set in dependence on the comparison value. For this purpose, the receiving devices of the communication terminal devices may include corresponding damping elements or damping circuits that may produce adjustable damping. The comparison value may be an electrical signal that may be used to control damping of the corresponding damping circuit.

BRIEF DESCRIPTION OF THE FIGURES

FIG. 1 depicts a schematic illustration of a communication device according to an embodiment.

DETAILED DESCRIPTION

FIG. 1 depicts in a schematic view, a communication device 10 that provides a communication connection between communication terminal devices 16, 18, 20, 22, 24, 26 that are connected to the communication device 10. The communication terminal devices 16, 18, 20, 22, 24, 26 may be sensors, actuators, data processing devices, control devices and/or similar. The communication device 10 may serve for example on a production line to couple the most diverse devices such that the devices communicate in the manner of field bus systems.

The communication device 10 includes a first communication line 12, that is configured as a two-wire line. The communication device 10 includes a second communication line 14, that is electrically isolated from the first communication line 12 and is configured as a two-wire line. Each of the two communication lines 12, 14 is terminated at a respective end by a respective terminating impedance 32. The terminating impedance 32 is selected such that as little reflection as possible occurs at the respective line end of the communication lines 12, 14. The communication lines 12, 14 are partly coupled to one another inductively and capacitively, as represented symbolically by the double-headed arrow 34.

The communication lines 12, 14 form segments 28, 30 of the communication device 10. The first segment 28 includes the communication line 12 to which the communication terminal devices 16, 18, 20 are connected. By way of the communication line 12, the communication terminal devices 16, 18, 20 may communicate with one another utilizing a predetermined communication protocol. As a result, the communication terminal devices 16, 18, 20 may utilize a hard-wired communication connection over the communication line 12.

For communicating over the communication line 12, the communication terminal devices 16, 18, 20 are configured to utilize the communication protocol that controls transmission and receiving of communication signals of the communication terminal devices 16, 18, 20. The communication terminal devices 16, 18, 20 include respective transmission devices and receiving devices, though the respective transmission devices and receiving devices are not illustrated in FIG. 1. The communication protocol provides for signal carriers that are formed by selected carrier frequencies, to be utilized for the communication. The signal carriers are modulated using a modulation method predetermined by the communication protocol in accordance with communication signals that are to be exchanged between the communication terminal devices 16, 18, 20. In the present case, a QAM modulation method is utilized as the modulation method. In the alternative embodiments, other communication methods may be used.

In principle, the second segment 30 including the communication line 14, to which the communication terminal devices 22, 24, 26 are connected, includes substantially the same configuration as regards communication regarding the segment 28. Thus, the segments 28, 30 may provide respective field bus systems.

Because of the coupling represented by the double-headed arrow 34, it may occur that signal carriers that are utilized in the first segment 28 for communication between the communication terminal devices 16, 18, 20 are fed to the communication line 14 of the second segment 30, for example because of crosstalk or feed over which may disrupt communication in the second segment 30 or in the reverse.

In order, despite this coupling of the segments 28, 30, to make reliable communication possible within the respective one of the segments 28, 30 between the communication terminal devices 16, 18, 20, 22, 24, 26 that are respectively connected to the respective communication lines 12, 14, the following method is provided, performed by the communication device 10. The communication device 10 may include a higher-level control device 36.

Embodiments are described by way of example with reference to examples of coupling the first segment 28 to the second segment 30 but the same method is applicable to the reverse case as well.

In an embodiment, the communication terminal devices 16, 18, 20 is configured such that, using respective transmission devices, over the first communication line 12 a transmission power of the signal carriers utilized may be set up. The transmission power is set up such that on the receiving side, in relation to the second communication line 14, a receiving signal strength of the signal carriers, for example, in relation to the communication terminal devices 22, 24, 26, is smaller than a predetermined comparison value. The comparison value is in this case selected such that, if a receiving signal strength is smaller than the comparison value, reliable communication between the communication terminal devices 22, 24, 26 over the second communication line 14 in the second segment 30 may be guaranteed. Despite the coupling of the first segment 28 to the second segment 30, it is possible to achieve reliable communication. At the same time, communication of the communication terminal devices 16, 18, 20 over the first communication line 12 in the first segment 28 may be maintained. By comparing the receiving signal strengths with the comparison value, it is possible to determine a transmission control signal for controlling the respective transmission powers of the transmission devices of the first segment 28.

In addition, or as an alternative, it is also possible to provide, on the receiving side, for a receiving sensitivity to the signal carriers from the first segment 28 to be set up on the second communication line 14 such that, on the receiving side, in relation to the second communication line 14, the receiving signal strength of the signal carriers of the first communication line 12 is smaller than the predetermined comparison value. In this embodiment, there is no need for any intervention in the first segment 28. The receiving signal strength may be set up such that, in their receiving devices, the communication terminal devices 22, 24, 26 include a damping circuit that is configured to be able to set the damping appropriately, in dependence on a suitable receiving control signal. The receiving control signal may be determined from the comparison with the comparison value which may also be the same signal as the transmission control signal. This damping circuit may be provided and utilized for the communication terminal devices 16, 18, 20, for example, when the reverse coupling case is considered.

Depending on requirements, embodiments described above may also to be used in combination with one another, even if both coupling devices are to be taken into account at the same time. The implementations are also simple because the corresponding devices often hardly need any retrofitting of hardware.

Embodiments are not restricted to utilizing only two communication lines or two segments Almost any number of segments or communication lines may be used, as desired. Where there are more than two segments or two communication lines, the couplings may be of very different kinds, as a result of which the respective comparison values may also be selected accordingly. Thus, more than just one comparison value may also be provided in order to be able to set up respective transmission devices and/or receiving devices.

Further, the comparison value may be determined and predetermined by the control device 36. The communication terminal devices 16, 18, 20, 22, 24, 26 may be connected to communicate with the control device 36 that achieves almost automatic adaptation to optimal communication conditions in the respective segments 28, 30 even during normal operation.

Embodiments relate to a method for communication between in each case at least two communication terminal devices 16, 18, 20, 22, 24, 26 that are connected to a respective one of at least two coupled communication lines 12, 14, in which a communication protocol is utilized for communication over the respective one of the communication lines 12, 14, and the communication protocol controls transmitting and receiving of communication signals of the respective ones of the at least two communication terminal devices 16, 18, 20, 22, 24, 26, for which purpose signal carriers are utilized. On the transmission side, on a first of the at least two communication lines 12, a transmission power of the signal carriers is set up and/or on the receiving side, on a second of the at least two communication lines 14, a receiving sensitivity to the signal carriers is set up such that on the receiving side, in relation to the second of the at least two communication lines 14, a receiving signal strength of the signal carriers of the first of the at least two communication lines 12 is smaller than a predetermined comparison value.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for communication between at least two communication terminal devices that are connected to a respective one of at least two at least partly electrically, inductively, capacitively, or inductively and capacitively coupled communication lines, the method comprising:
configuring for signal carriers, a communication protocol for communication over the at least two communication lines, wherein the communication protocol controls transmitting and receiving of communication signals of the at least two communication terminal devices;
setting a transmission power of the signal carriers on a transmission side on a first of the at least two communication lines and a receiving sensitivity to the signal carriers on a receiving side on a second of the at least two communication lines such that on the receiving side, in relation to the second of the at least two communication lines, a receiving signal strength of the signal carriers of the first of the at least two communication lines is smaller than a predetermined comparison value.

2. The method of claim 1, wherein the transmission power of the signal carriers, the receiving sensitivity to the signal carriers, or the transmission power and the receiving sensitivity to the signal carriers is set to be the same.

3. The method of claim 1, further comprising:
predetermining the comparison value such that over the second of the at least two communication lines by demodulating the respective ones of the signal carriers the communication signals transmitted with the signal carriers over the second of the at least two communication lines are determined to be undisrupted.

4. The method of claim 1, wherein the comparison value is predetermined at the time of startup of communication.

5. The method of claim 1, wherein the comparison value is predetermined at predetermined time points.

6. The method of claim 3, wherein predetermining the comparison value further comprises:
   determining receiving signal strengths of the signal carriers of the first of the at least two communication lines over the second of the at least two communication lines with a predetermined receiving sensitivity, and the comparison value is predetermined in dependence on the receiving signal strengths of the signal carriers of the first of the at least two communication lines.

7. The method of claim 6, further comprising:
   outputting a message signal when the comparison value is predetermined such that a channel capacity for the signal carriers of the second of the at least two communication lines is smaller than a predetermined channel capacity comparison value.

8. The method of claim 1, wherein the receiving sensitivity comprises a damping of receiving of the signal carriers that is set in dependence on the comparison value.

9. The method of claim 1, wherein the signal carriers are modulated using at least one modulation method, predetermined by the communication protocol, in accordance with the communication signals.

10. A communication terminal device comprising:
   a detection device configured to detect a receiving signal strength; and
   at least two communication terminal devices connected to a respective one of at least two at least partly electrically, inductively, capacitively, or inductively and capacitively coupled communication lines;
   wherein for signal carriers a communication protocol is configured for communication is over the at least two communication lines, wherein the communication protocol controls transmitting and receiving of communication signals of the at least two communication terminal devices; wherein a transmission power of the signal carriers is set on a transmission side on a first of the at least two communication lines and a receiving sensitivity is set to the signal carriers on a receiving side on a second of the at least two communication lines such that on the receiving side, in relation to the second of the at least two communication lines, a receiving signal strength of the signal carriers of the first of the at least two communication lines is smaller than a predetermined comparison value.

11. The communication terminal device of claim 10, wherein the transmission power of the signal carriers, the receiving sensitivity to the signal carriers, or the transmission power and the receiving sensitivity to the signal carriers is set to be the same.

12. The communication terminal device of claim 10, wherein the comparison value is predetermined such that over the second of the at least two communication lines by demodulating the respective ones of the signal carriers the communication signals transmitted with the signal carriers over the second of the at least two communication lines are determined to be undisrupted.

13. The communication terminal device of claim 10, wherein the comparison value is predetermined at the time of startup of communication.

14. The communication terminal device of claim 10, wherein the comparison value is predetermined at predetermined time points.

15. The communication terminal device of claim 12, wherein a message signal is output when the comparison value is predetermined such that a channel capacity for the signal carriers of the second of the at least two communication lines is smaller than a predetermined channel capacity comparison value.

16. The communication terminal device of claim 10, wherein the receiving sensitivity comprises a damping of receiving of the signal carriers that is set in dependence on the comparison value.

17. The communication terminal device of claim 10, wherein the signal carriers are modulated using at least one modulation method, predetermined by the communication protocol, in accordance with the communication signals.

* * * * *